(12) United States Patent
Bamba

(10) Patent No.: US 8,165,016 B2
(45) Date of Patent: Apr. 24, 2012

(54) METHOD AND APPARATUS FOR SETTING COMMUNICATION PATHS IN A NETWORK

(75) Inventor: Masakazu Bamba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 253 days.

(21) Appl. No.: 12/536,589

(22) Filed: Aug. 6, 2009

(65) Prior Publication Data
US 2010/0054262 A1    Mar. 4, 2010

(30) Foreign Application Priority Data
Aug. 27, 2008 (JP) .................. 2008-218139

(51) Int. Cl.
*G01R 31/08* (2006.01)
(52) U.S. Cl. ...................................... 370/228
(58) Field of Classification Search .............. 370/216, 370/223, 225, 400, 219, 228; 709/120
See application file for complete search history.

(56) References Cited

U.S. PATENT DOCUMENTS
2004/0246892 A1* 12/2004 Elie-Dit-Cosaque et al. 370/216
2005/0188242 A1* 8/2005 Rabbat et al. .............. 714/4
2008/0056294 A1 3/2008 Maeda et al.
2010/0296393 A1* 11/2010 Owens et al. .............. 370/225

FOREIGN PATENT DOCUMENTS
JP    2008-60755    3/2008

OTHER PUBLICATIONS

J.P. Lang, et al., "RSVP-TE Extensions in Support of End-to-End Generalized Multi-Protocol Label Switching (GMPLS) Recovery", Network Working Group, Request for Comments: 4872 (rfc4872), updates 3471, Category: Standards Track, May 2007.
D. Awduche, et al., "RSVP-TE: Extensions to RSVP for LSP Tunnels", Network Working Group, Request for Comments: 3209 (rfc3209), Category: Standard Track, Dec. 2001.

* cited by examiner

*Primary Examiner* — Man Phan
*Assistant Examiner* — Kevin Lee
(74) *Attorney, Agent, or Firm* — Staas & Halsey LLP

(57) ABSTRACT

Two path setting sides are determined between a pair of nodes in a network, and two path setting messages are created. The two path setting messages each includes information on a path switch default direction, a wait-to-restore timer value, and a mode identifier identifying a revertive mode. Then the two different communication paths are concurrently set between the pair of nodes by transmitting concurrently the created two path setting messages between the pair of nodes. In the case of the revertive mode, a communication path set on a side identified by the path switch default direction is operated as a working path either in an initial state or when no faults have occurred during a time period indicated by the wait-to-restore timer value after recovery of the fault on the first side.

8 Claims, 18 Drawing Sheets

FIG. 1

| | PATH SWITCH DEFAULT DIRECTION | WAIT-TO-RESTORE TIMER VALUE |
|---|---|---|
| REVERTIVE MODE | NEEDED | NEEDED |
| NON-REVERTIVE MODE | NEEDED | NOT NEEDED |

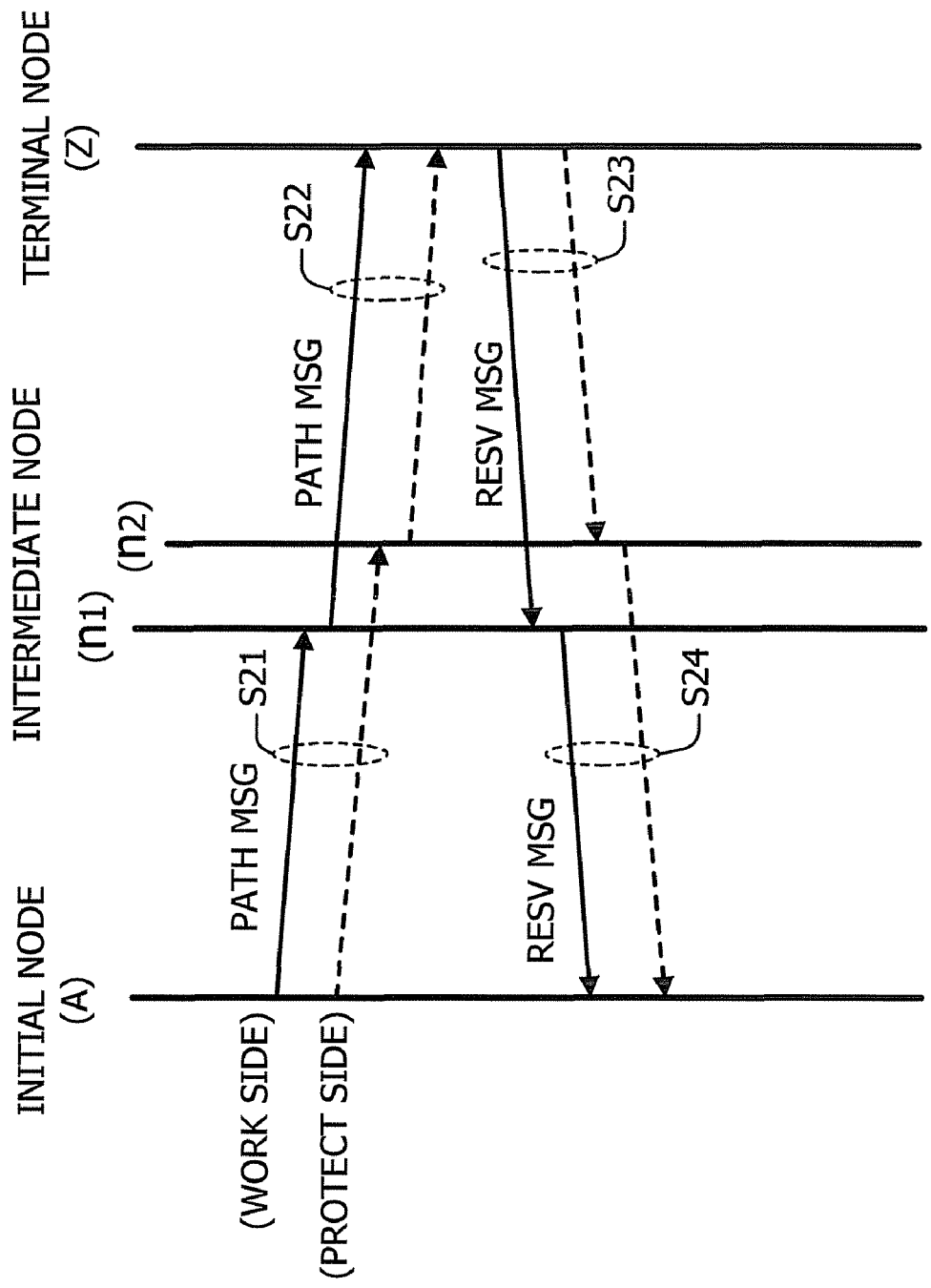

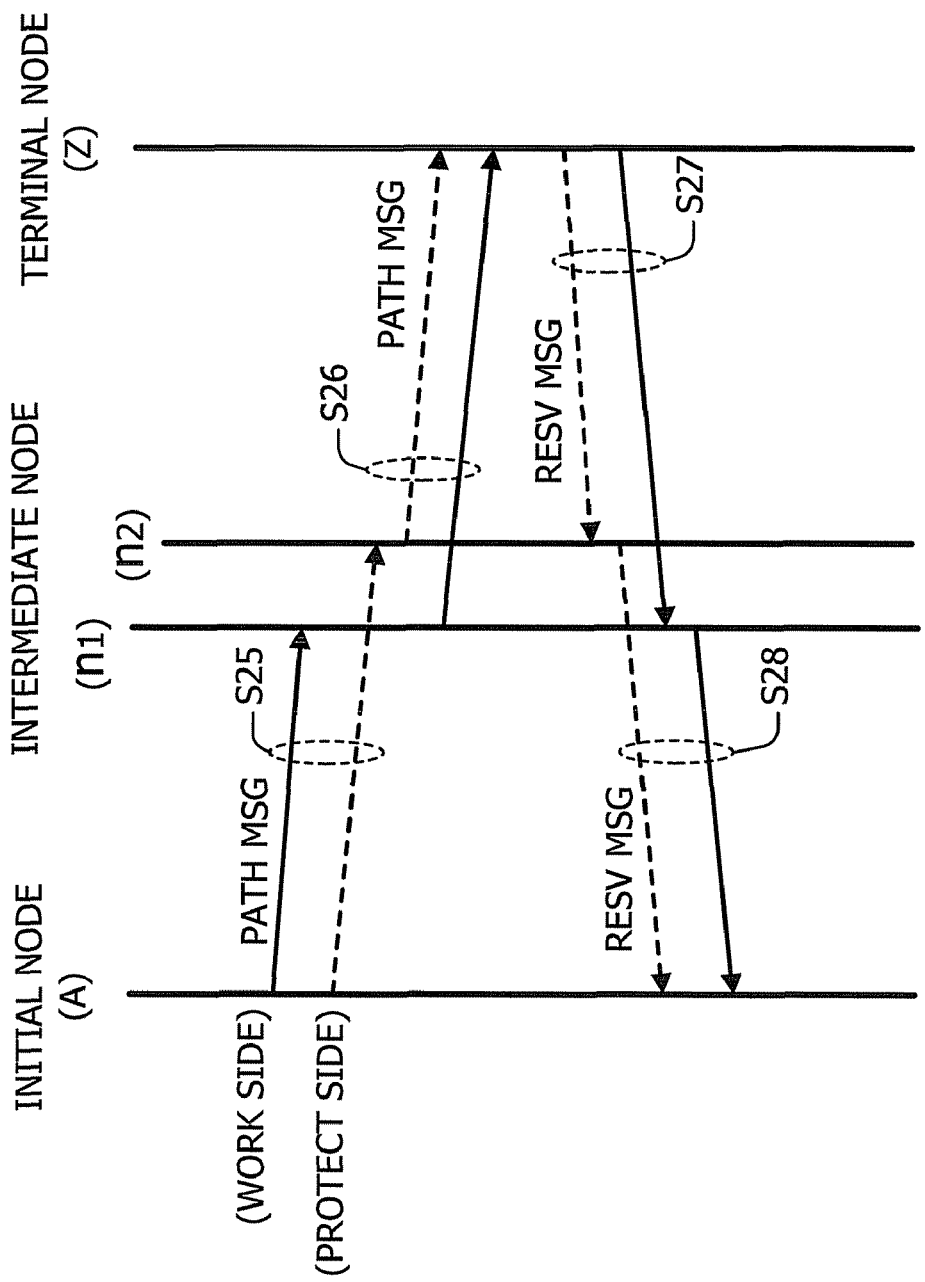

METHOD AND APPARATUS FOR SETTING COMMUNICATION PATHS IN A NETWORK

CROSS-REFERENCE TO RELATED APPLICATIONS

This application is based upon and claims the benefit of priority of the prior Japanese Patent Application No. 2008-218139, filed on Aug. 27, 2008, the entire contents of which are incorporated herein by reference.

FIELD

The present invention relates to an apparatus and a method for setting communication paths in a network.

BACKGROUND

A network requiring reliability commonly has redundant configuration such as a "1+1 protected path configuration" in order to prevent interruption of service when a failure has occurred. The 1+1 protected path configuration allows a continued operation of service, by setting two communication paths corresponding two respective path setting sides (or path setting directions) of a work side and a protect side, and by switching a working path that is a currently operating path on the work side to a spare path on the protect side when a failure has occurred on the work side.

In the case of conventional networks such as SONET (Synchronous Optical NETwork) or SDH (Synchronous Digital Hierarchy), setting of communication paths is performed under central control of a network management system, and a technology of UPSR (Unidirectional Path Switched Ring) is employed for setting the 1+1 protected path.

Regarding path switching (Path Switch), as attributes thereof, a "revertive mode", a "path switch default direction", and a "wait-to-restore timer value" are used.

The revertive mode is a mode for performing the following operation. In principle, a work side is set as a path switch default direction, and a communication path set on a path setting side (or a path setting direction) identified by the path switch default direction, that is, on the work side, is operated as a working path in an initial state. When a fault has occurred on the work side, a working path is switched to the protect side so as to continue the operation. Thereafter, when any failures have not been detected on the protect side during a time period of wait-to-restore timer value after recovery of the fault on the working side, a working path switches back to the side identified by the path switch default direction, that is, to the work side.

A non-revertive mode is a mode for performing the following operation. When a fault has occurred on the work side, a working path is switched to a spare path on the protect side so as to continue the operation, and even when the fault on the work side is restored, the operation is continuously performed by using the currently working path on the protect side. The above is the operation in the non-revertive mode.

The path switch default direction indicates a normally used one of the work side and the protect side in the operation of the revertive mode, and a communication path set thereon is operated as a working path in the initial state. The wait-to-restore timer value is a time period for monitoring that there are no faults occurring on the protect side, in the case of the revertive mode, after recovery of the fault on the work side, in order to switch back a working path from the protect side to the work side.

FIG. 1 is a diagram illustrating an example of relations between attribute values and modes of path switching. In the revertive mode, the path switch default direction and the wait-to-restore timer value are needed. In the non-revertive mode, the path switch default direction is needed, but the wait-to-restore timer value is not needed.

In networks utilizing SONET/SDH and DWDM (Dense Wavelength ivision Multiplexing), attention is now being paid to a path setting method utilizing GMPLS which is expected to simplify the maintenance of a network because communication paths can be autonomously set in the network by GMPLS.

Standardization of GMPLS is now being promoted and a 1+1 protect path mounting method is being investigated therein (for example, RFC4872). Therein, identifiers named a label switch path ID (LSP ID) (defined in RFC 3209) and an association ID (Association ID) (defined in RFC4872) are used to relate a communication path on the work side (a work-side path) to a communication path on the protect side (a protect-side path). The label switch path ID is an identifier for identifying an end-to-end path and the Association ID is an identifier for identifying the other path paired therewith in a redundant configuration.

In addition, in order to distinguish the work side from the protect side, an identifier named a protecting bit (Protecting Bit) (defined in RFC4872) is used. The default value of the protecting bit is "0" which indicates the work side, and the value "1" thereof indicates the protect side. By this method, it has become possible to discriminate between the work side and the protect side of automatically generated communication paths.

FIG. 2 is a diagram illustrating an example of a format of a path setting message including a path message (abbreviated as "Path Msg") for requesting path setting and a reserve message (abbreviated as "Resv Msg") for informing of completion of path setting, which is described on the basis of TLV (Type Length Value) utilized in RSVP-TE (Resource Reservation Protocol-Traffic Engineering). In TLV, arbitrary information can be transmitted by describing the type (Type) of a value (Value) and the length (Length) of a structure (Object).

In FIG. 2, a block BL1 of the head two lines is a description about the entire message, and in "Msg Type", "1" indicates a path message and "2" indicates a reserve message. A block BL2 is a sender template object (Sender Template Object) and a label switch path ID "LSP ID" is included therein. A block BL3 is an association object (Association Object) and an association ID "Association ID" is included therein. A block BL4 is a protection object (Protection Object) and a protecting bit "P" is included therein Japanese Laid-Open Patent Publication No. 2008-60755 also discloses a signaling technique for distinguishing and managing a work side and a protect side, like RFC4872

SUMMARY

According to an aspect of the embodiment, there is provided a method for setting two different communication paths between a pair of nodes in a network.

Two path setting sides on which two different communication paths each connecting the pair of nodes are to be set, respectively, are determined, and two path setting messages for setting the two different communication paths are created. The two path setting messages each includes information on a path switch default direction identifying one of the two path setting sides on which a working path is to be set in an initial state, a wait-to-restore timer value, and a mode identifier identifying a revertive mode. Then, two different communication paths are concurrently set between the pair of nodes by transmitting concurrently the created two path setting messages between the pair of nodes. In the revertive mode, a first communication path set on a first path setting side identified by the path switch default direction is operated as a working path in the initial state, a second communication path set on a second path setting side that is the other one of the two path setting sides is operated as a working path upon occurrence of a fault on the first path setting side, and the first communication path set on the first path setting side is again operated as a working path when no faults have occurred during a time period indicated by the wait-to-restore timer value after recovery of the fault on the first path setting side.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF THE DRAWINGS

FIG. 1 is a diagram illustrating an example of relations between attribute values and modes of path switching;

FIGS. 5A and 5B are diagrams each illustrating an example of a message sequence for setting a 1+1 protected path by a simultaneous setting method;

DESCRIPTION OF EMBODIMENTS

The method of mounting the 1+1 protected path in GMPLS is being investigated as described above and several extensions are made. However, even with these extensions, there still remain some insufficient parts as to parameters utilized in conventional central management. That is, in the case that a 1+1 protected path has been set in GMPLS, there is no means to transfer parameters such as the "Revertive mode", the "Path Switch default direction", and the "Wait-To-Restore timer value", which are used in a revertive mode, from an initial point to a terminal point, and hence only the non-revertive mode can be supported as an operational mode.

In the case that communication paths are actually set by using information defined in RFC4872 or the like, two methods are available. One is a method called a sequential setting method of setting a protect-side path after setting a work-side path, and the other is a method called a simultaneous setting method of simultaneously setting both the work-side path and the protect-side path. The sequential setting method has such a drawback that the time taken for path setting is longer than that of the simultaneous setting method.

As mentioned above, in the case that a 1+1 protected path has been set in GMPLS, only the non-revertive mode can be used as the path switching mode. In addition, in order to firstly operate a communication path set on the work side, the sequential setting method needs to be employed. In other words, in the case of operation by the simultaneous setting method, it is not ensured that a path set on the work side always becomes a working path at an initial state. If such a situation occurs that an expected path on the work side is not selected as a working path at an initial state, it will become necessary to, for example, manually select the expected path on the work side by using a network monitor device.

Next, the above mentioned problems will be described in detail.

Figure 3:
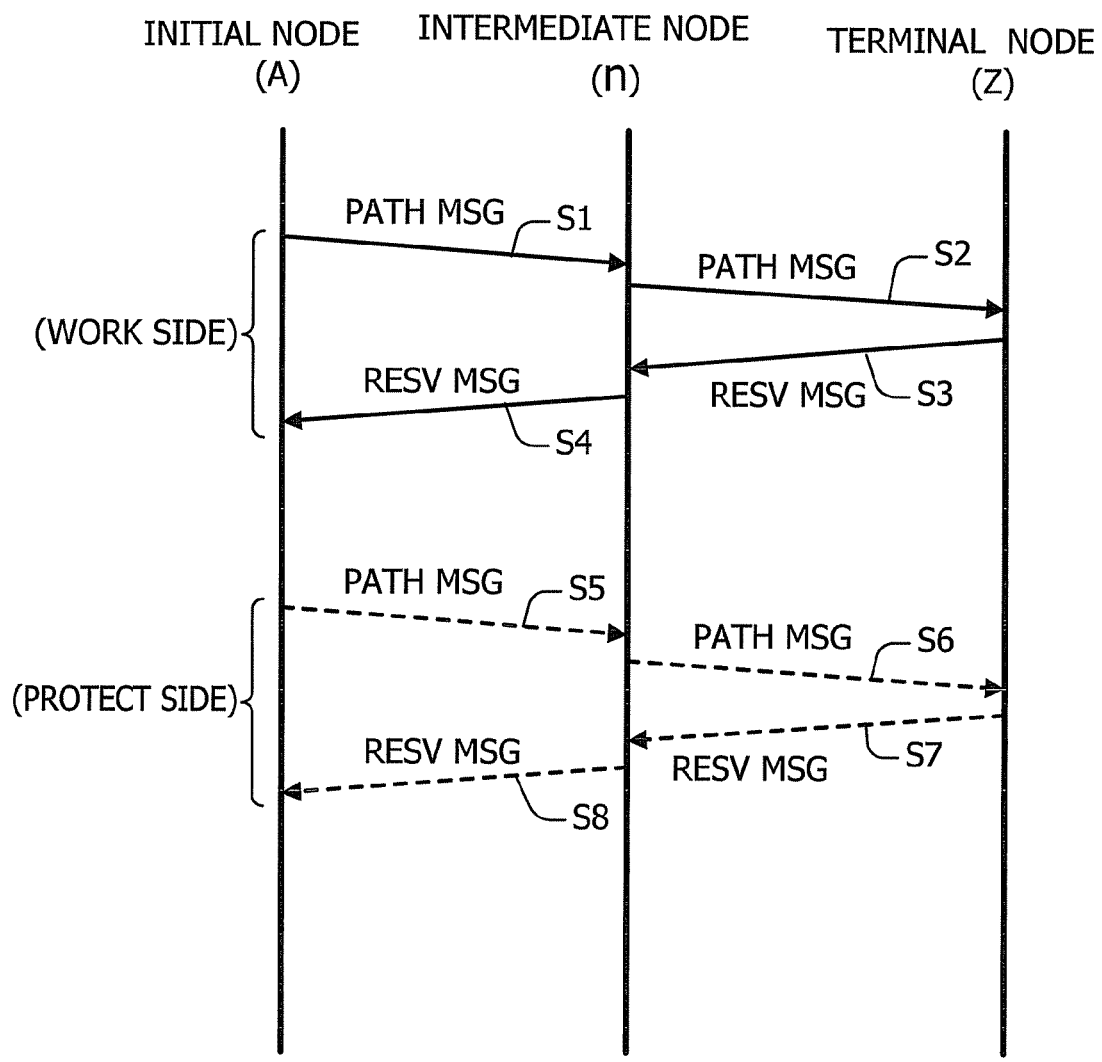
FIG. 3 is a diagram illustrating an example of a message sequence for setting a 1+1 protected path by a sequential setting method.

FIG. 3 is a diagram illustrating an example of a message sequence for setting a 1+1 protected path by a sequential setting method.

In FIG. 3, initial node A starts a path setting process on the work side after determining LSP IDs of both the work side and the protect side. That is, in order to set a communication path on the work side (hereinafter described as "a work-side path"), initial node A sets to a path message (denoted by "Path Msg" in FIG. 3) the determined LSP ID of the work side as a LSP ID thereof and the determined LSP ID of the protect side as an Association ID thereof, and then transmits the path message including them to terminal node Z via intermediate node n (in steps S1, S2). After performing path setting, terminal node Z transmits a reserve message (denoted by "Resv Msg" in FIG. 3) to initial node A via the intermediate node n in response to the path message (in steps S3, S4). Hereinafter, a path message (Path Msg) or a reserve message (Resv Msg) will be also described as a path setting message.

When the path setting of the work side has been done successfully, initial node A starts a process of setting a communication path on the protect side (hereinafter describes as "a protect-side path"). That is, initial node A sets a communication path on the work side (a work-side path) so that the determined LSP ID of the protect side is set as a LSP ID thereof and the determined LSP ID of the work side is set as an Association ID thereof, and then transmits a path message including them to terminal node Z via the intermediate node n (in steps S5, S6). After performing path setting process, terminal node Z transmits a reserve message to initial point node A via the intermediate node n in response to the path message. (in steps S7, S8).

As described above, according to the sequential setting method, a process of setting a path is started from the work side and a process of setting a communication path on the protect side (a protect-side path) is not performed unless path setting of the work-side path has been done successfully. Therefore, the work-side path always becomes a working path whereas the protect-side path becomes a spare path.

However, the drawback of this method lies in that due to its sequential procedure, it takes more time than the simultaneous setting method of setting two communication paths at once. In particular, a required time is noticeable in the case where several tens to about one hundred paths need to be set in the real operation.

Figure 4:
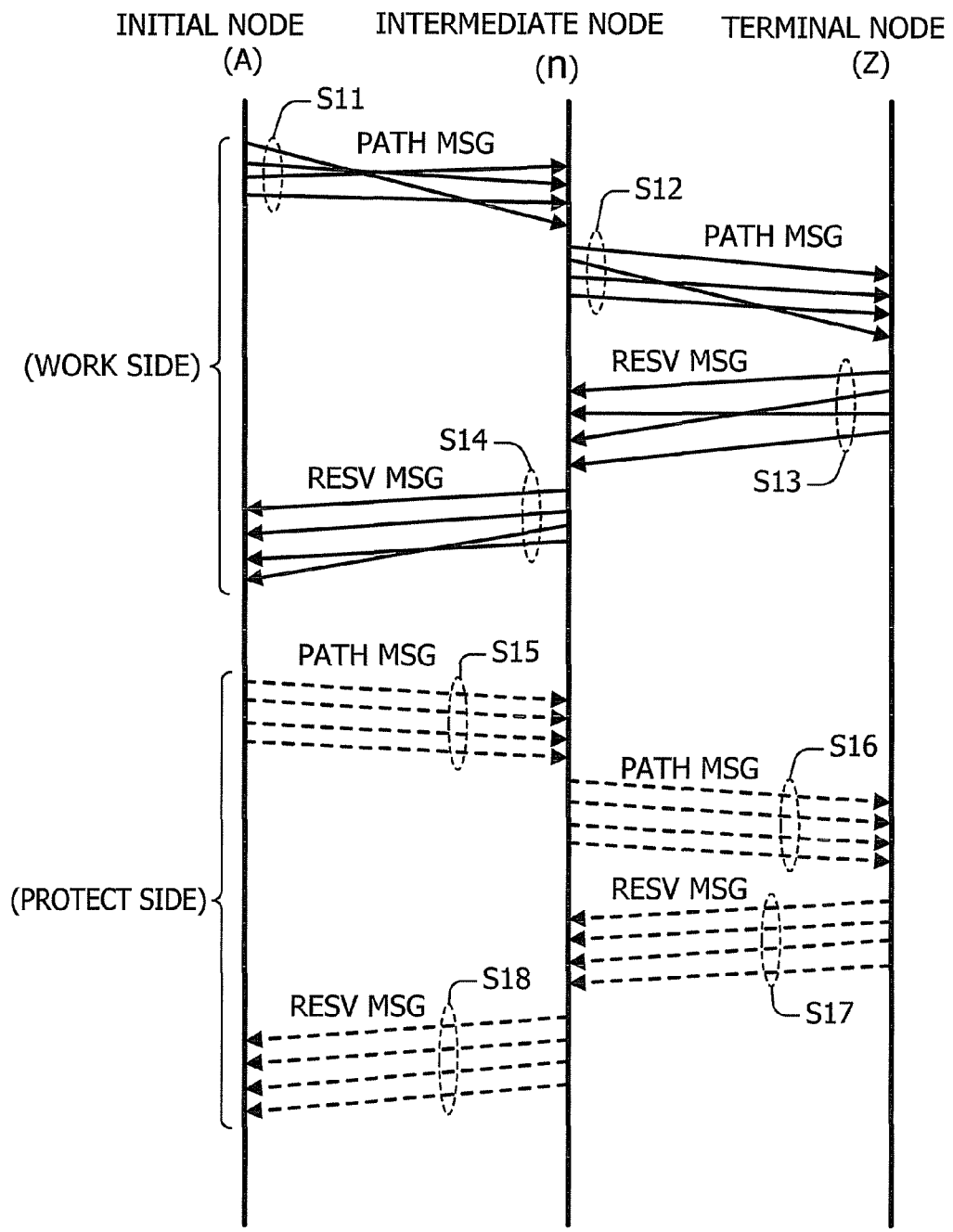
FIG. 4 is a diagram illustrating an example of a message sequence for setting a plurality of communication paths by a sequential setting method.

FIG. 4 is a diagram illustrating an example of a message sequence for setting a plurality of communication paths. In FIG. 4, initial node A simultaneously transmits a plurality of path messages needed for setting the plurality of communication paths (in step S11). These path messages are processed at intermediate node n (or at a group of intermediate nodes) so as to be transferred toward terminal node Z (in step S12). The plurality of path messages are not ensured to pass through the same route unless each thereof explicitly designates the same route as a route to be passed through thereby. That is, each of the plurality of path messages may sometimes pass through a different route depending on the communication path to be set. Therefore, the plurality of path messages may arrive at terminal node Z in random order. Likewise, messages from terminal node Z to initial node A may also arrive thereat in random order influenced by the processing at the group of intermediate nodes (in steps S13, S14).

Initial node A sequentially processes the received reserve messages in the order of arrivals, and transmits path messages on the protect side to terminal node Z (in steps S15, S16). Terminal node Z also sequentially processes the received path messages in the order of arrivals, and transmits reserve messages to initial node A (in steps S17, S18). Although it looks as if messages arrive at equal intervals in FIG. 4, actually, neither the order of arrivals nor the interval of arrivals may be ensured.

The drawback of the sequential setting method lies in that a message (a path message or a reserve message) is reciprocated between an initial node and a terminal node as many as two times in order to set one 1+1 protected path, amplifying the unstable state of path setting. In the following example, a sequential setting method is compared with a simultaneous setting method. Here, it is assumed that it takes 30 sec for a message to travel from initial node A to terminal node Z and that it takes 30 sec to process the message at initial node A or terminal node Z. Then the time required for a message of the work side traveling from initial node A to terminal node Z and traveling back from terminal node Z to initial node A, is "0 sec (no processing at A)+30 sec (A to Z)+30 sec (for processing at Z)+30 sec (Z to A)", amounting to 90 sec. In addition, the time required for a message of the protect side traveling from initial node A to terminal node Z and traveling back to initial node A via terminal node Z, is "30 sec (for processing at A)+30 sec (A to Z)+30 sec (for processing at Z)+30 sec (Z to A)+30 sec (for processing at A)", amounting to 150 sec. As a result, the total required time becomes 240 sec (90 sec+150 sec). Meanwhile in the case of the simultaneous method, the required time is "0 sec (no processing at A)+30 sec (A to Z)+60 sec (for processing at Z, 30×2 for the work side and the protect side)+30 sec (Z to A)+60 sec (for processing at Z, 30×2 for the work side and the protect side)", amounting to 180 sec in total.

As described above, in the case of the sequential setting method, the extra time for reciprocating a message on the protect side (in the example, 60 sec) is needed in comparison with the simultaneous method.

FIG. 5A, 5B are diagrams each illustrating an example of a message sequence for setting a 1+1 protected path, where FIG. 5A illustrates the case where reversing of a message sequence does not occur in the process of transmitting messages and FIG. 5B illustrates the case where reversing of a message sequence occurs in the process of transmitting messages.

In any of FIGS. 5A and 5B, at initial node A, after LSP IDs of the work side and the protect side have been set, the LSP ID of the protect side is set to the Association ID of the work side and the LSP ID of the work side is set to the Association ID of the protect side, and settings of two communication paths are performed simultaneously. That is, initial node A transmits two path messages to terminal node Z via intermediate nodes n1 and n2, respectively, (in steps S21, S22, or in steps S25, S26) and terminal node Z transmits two reserve messages to initial node A after performing path setting (in steps S23, S24, or in steps S27, S28).

In the case of the simultaneous setting method, a communication path on the work side (a work-side path) is not always set first since path setting is simultaneously performed on both the work side and the protect side. That is, in some cases, a path on the protect side (a protect-side path) may be set as a working path and a work-side path may be set as a spare path. It is because that processing on the work side is performed out of synchronization with processing on the protect side and the traveling time of a message from initial node A to terminal node Z differs in accordance with a difference in the number of intermediate nodes from initial node A to terminal node Z and in the processing speed of intermediate nodes relaying messages. In the case of FIG. 5A, a work-side path is set as a working path because reversing of a message sequence does not occur in the process of transmitting messages. However, in the case of FIG. 5B, a protect-side path is set as a working path because reversing of a message sequence occurs in the process of transmitting messages.

The merit of the simultaneous setting method lies in that the setting of communication paths thereby is completed earlier than the setting of communication paths by the sequential setting method as mentioned above since the path setting process thereby is performed simultaneously both on the work side and the protect side. However, it has such a drawback that a user cannot recognize which side will be operated actually since the side on which the setting of a communication path has happened to be completed earlier becomes an actually operated side. In order to overcome this drawback, for example, the user has to confirm which side is currently used, for example, by means of a network monitoring device, and, in some cases, has to perform operation for setting the desired path as a working path by means of the network monitor device.

Figure 6:
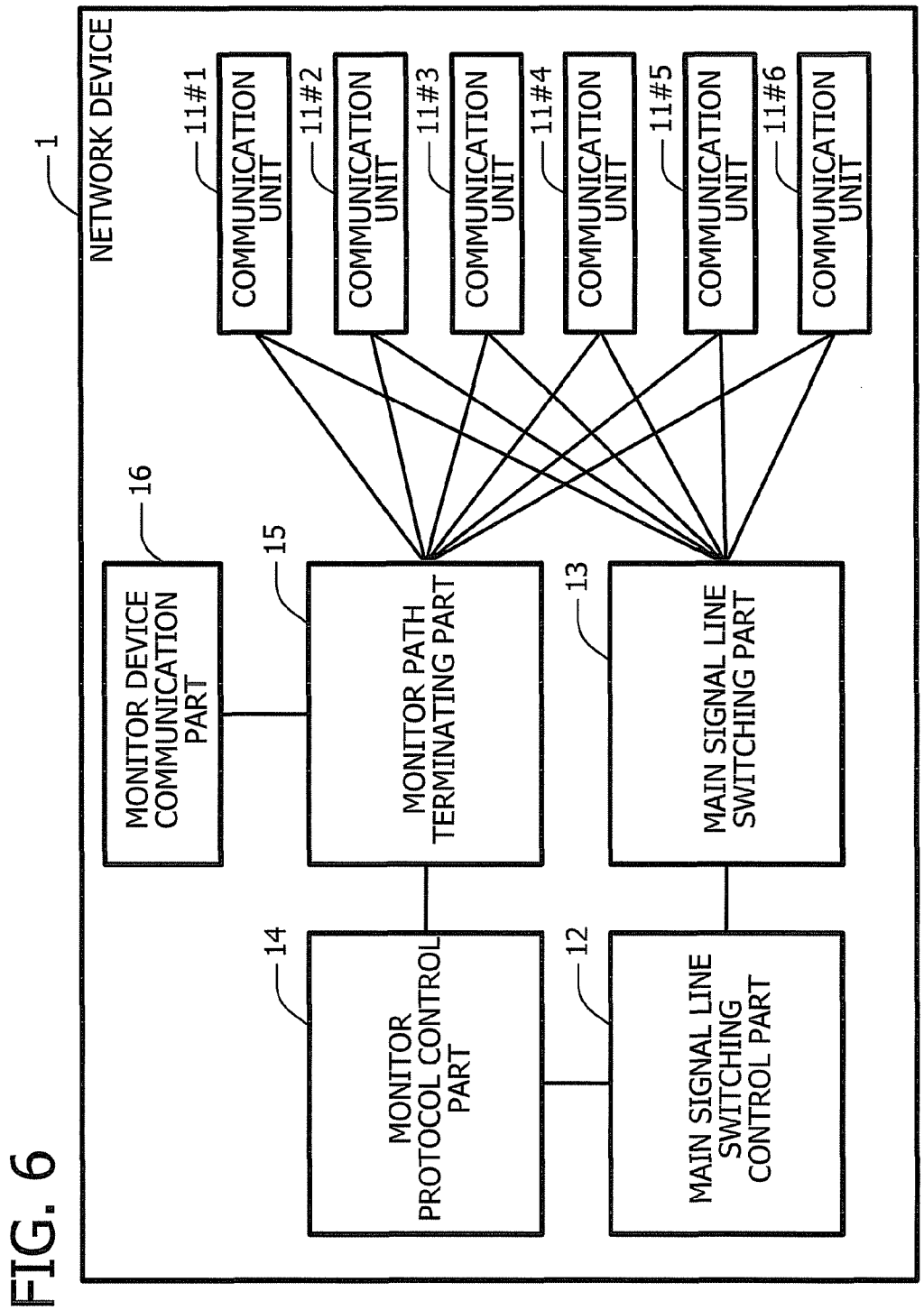
FIG. 6 is a diagram illustrating an example of a configuration of a network device, according to an embodiment.

FIG. 6 is a diagram illustrating an example of a configuration of a network device, according to an embodiment.

In FIG. 6, the network device 1 includes communication units 11 (11#1 to 11#6), a main signal line switching control part 12, a main signal line switching part 13, a monitor protocol control part 14, a monitor path terminating part 15 and a monitor device communication part 16.

The communication unit 11 is a interface device for exchanging a main signal (user data) and control data, such as signals from a network monitor device and signals of OSPF-TE (Open Shortest Path First-Traffic Engineering) protocol and RSVP-TE protocol), with other devices, and terminates a signal such as an optical signal (OCn) and an electric signal (ECn).

The main signal line switch control part 12 controls connections among the communication units 11 by instructing the main signal line switch part 13 to set a communication path.

The main signal line switch part 13 is a device for switching a main signal transmitted from a communication unit 11 to another communication unit 11, and performs line switching in accordance with an instruction from the main signal line switch control part 12. Arbitrary channels (for example, STS-ch) among the plurality of communication units 11 can be connected each other by the instructions given by the main signal line switch part 13.

The monitor protocol control part 14 is a part for performing processing of OSPF-TE and RSVP-TE needed to actually maintain the GMPLS network, and analyzes data received from the monitor path terminating part 15 to perform processing conforming to the analyzed data. In the case, upon receiving the data requesting for setting a communication path, the monitor protocol control part 14 requests the main signal line switching control part 12 to perform setting of a communication path.

The monitor path terminating part 15 is a part for generating and terminating information to be transmitted to or received from the network monitor device and other devices. In the case, the monitor path terminating part 15 terminates GMPLS network related information transmitted through an OSI (Open Systems Interconnection) network or a TCP/IP (Transmission Control Protocol/Internet Protocol) network, and converts the information into a form that can be easily processed by the monitor protocol control unit 14.

The monitor device communication part 16 is an interface for connecting the network monitor device to the network device 1.

Figure 7:
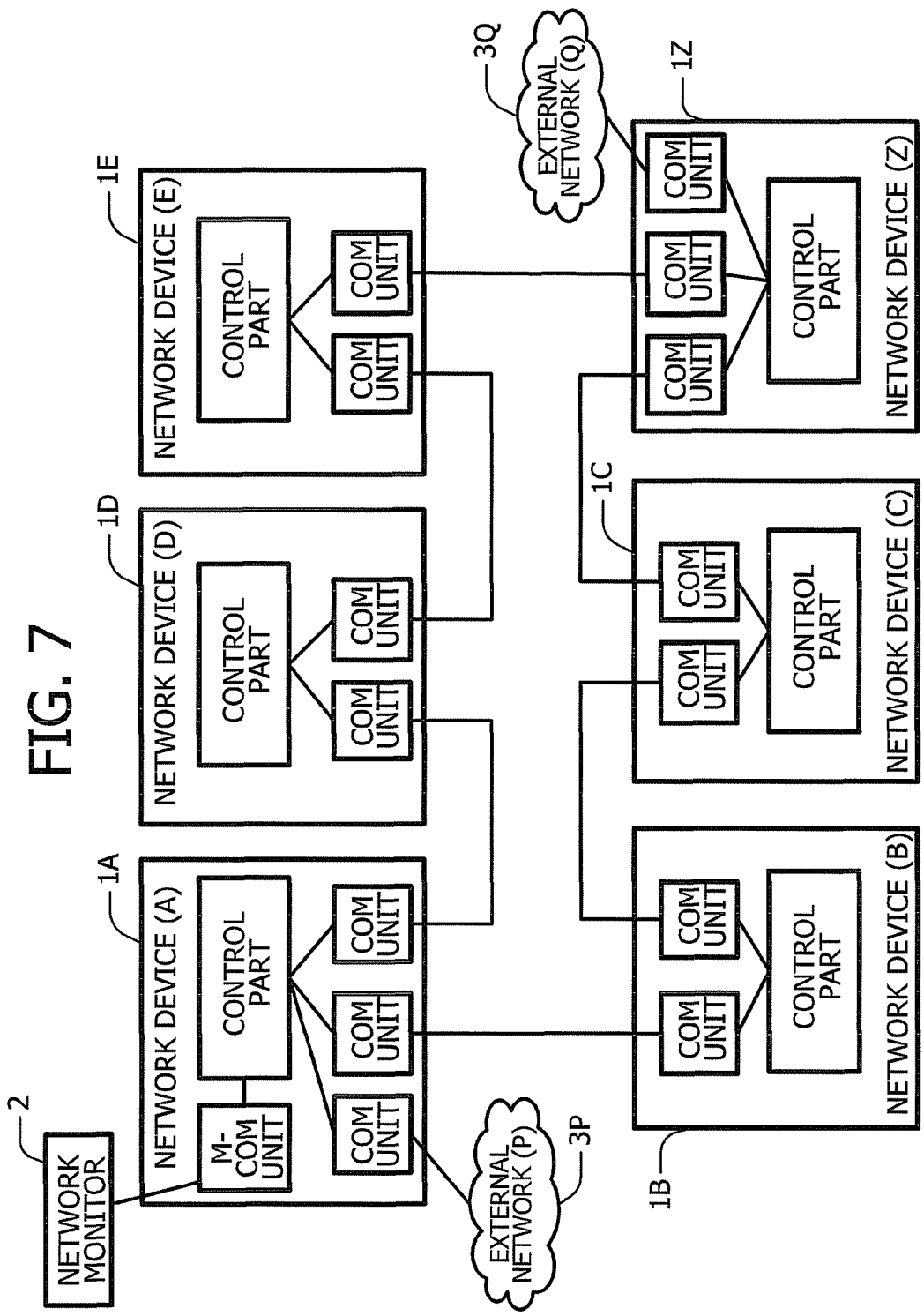
FIG. 7 is a diagram illustrating an example of a network including a plurality of network devices, according to an embodiment.

FIG. 7 is a diagram illustrating an example of a network including a plurality of network devices, according to an embodiment. In FIG. 7, the network devices 1A-1E and 1Z are present within a GMPLS network, an external network 3P is connected to the network device 1A, and an external network 3Q is connected to the network device 1Z. In addition, the network monitor device 2 is connected to the network device 1A. In the case, it is assumed that a user wishes to connect the external network 3P to the external network 3Q via a network including the network devices 1A to 1E and 1Z, that is, a so-called "SPC (Soft Permanent Connection)" model is assumed. Here, the network device 1A and 1Z become a initial node and a terminal node, respectively, and the network devices 1B-1E become intermediate nodes.

In the case, there are two points to be considered. One point is how information on a revertive mode, a path switch default direction, and a wait-to-restore timer value is shared between the initial node and the terminal node. Another point is how a work-side path is correctly set as a working path efficiently. The former point is a matter needed for controlling path switching. The latter point will be needed in order to set the work-side path as a working path without an unwanted switching operation, for example, a switching operation controlled by the network monitor device.

In order to share parameters for controlling path switching between the initial node and the terminal node, a reserved area of a protection object defined in RFC 4872 can be utilized, according to the embodiment.

Figure 8:
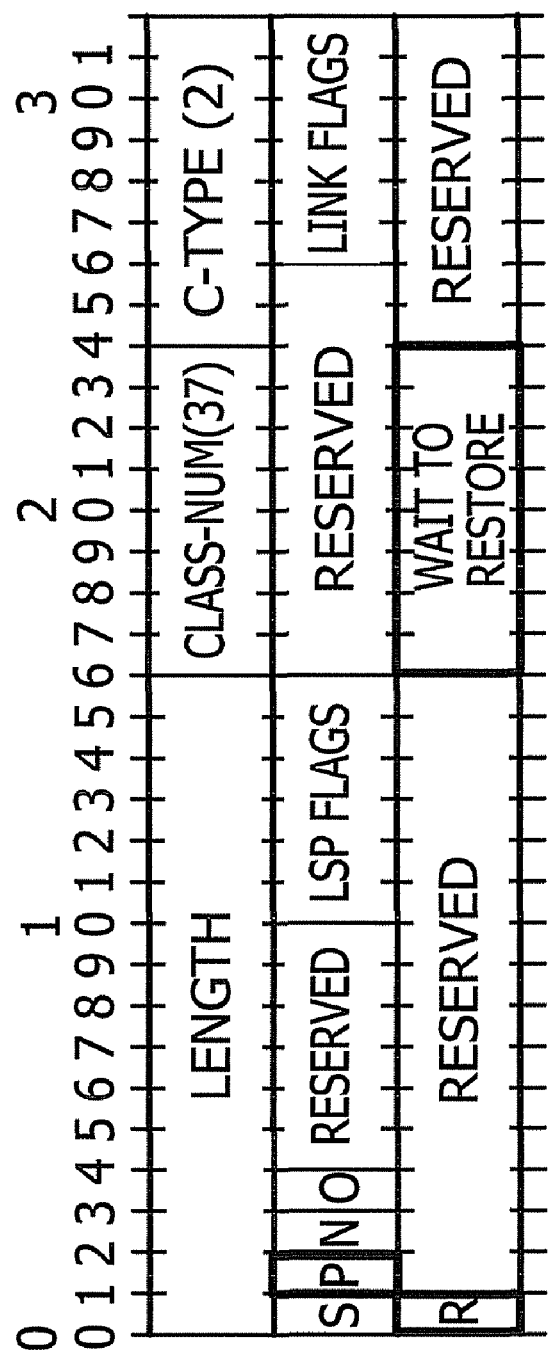
FIG. 8 is a diagram illustrating an example of a format of a protection object, according to an embodiment.

FIG. 8 is a diagram illustrating an example of a format of a protection object, in which a mode identifier identifying the revertive mode and a wait-to-restore timer value are allocated to the last line thereof (the reserved area). In FIG. 8, an "R" bit of the last line is used as the mode identifier, and "Wait-To-Restore" bits are used as a wait-to-restore timer value.

Figure 2:
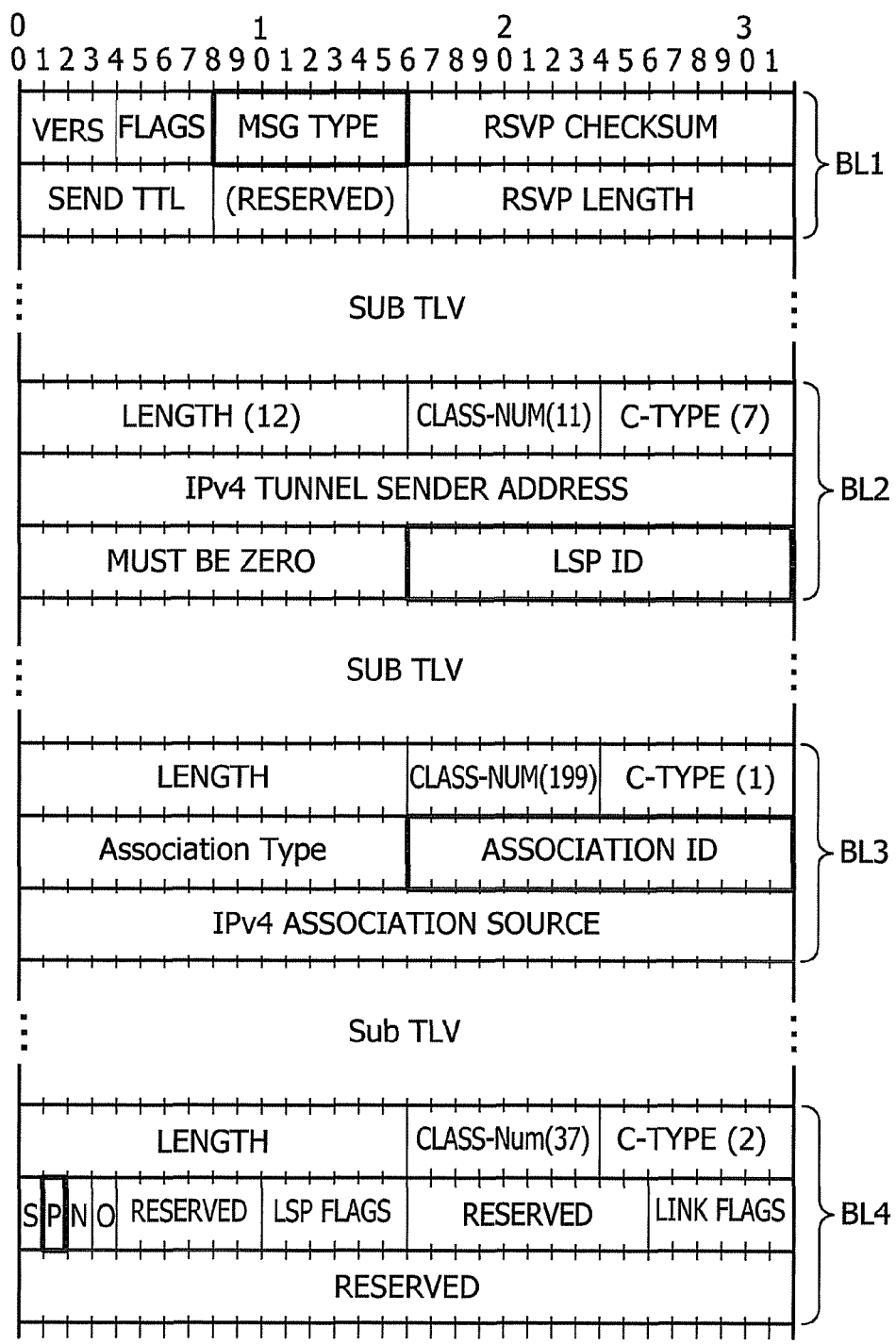
FIG. 2 is a diagram illustrating an example of a format of a path setting message.

According to the embodiment, the block BL 4 of the path message in FIG. 2 is replaced with the protection object depicted in FIG. 8 so as to transmit a mode identifier and a wait-to-restore timer value from the initial node to the terminal node. In addition, information on "a path switch default direction" can be obtained based on a later described path setting logic by utilizing a protecting bit "P" of the protection object which is allocated to a bit in the second line of the protection object in FIG. 8.

Next, in the network configuration depicted in FIG. 7, it is assumed that a user issues a request for RSVP-TE based path setting to network device 1A and network device 1A performs route calculation to establish a 1+1 protected path from network device 1A to network device 1Z.

In this case, network device 1A at the initial node sets parameters input from the user (a revertive mode, a path switch default direction, and a wait-to-restore timer value) to a protection object which is then set to a path message. Network device 1Z at the terminal node receives the path message including that protection object and analyzes the received path message in accordance with a predetermined path setting logic that will be later described with reference to FIG. 11. Here, firstly, the path switch default direction is determined from the protecting bit of the protection object. Thereafter, an extended part (or reserved area) of the protection object is read out to determine whether it indicates the revertive mode or not. In the case of the revertive mode, the wait-to-restore timer value is next read out from the extended part (or the reserved area) of the protection object. Then, setting of a communication path is performed by utilizing these values. In order to efficiently set a work-side path as a working path, it is necessary to control the order of processes such that the path setting process on the work side is performed earlier than the path setting process on the protect side at both the initial and terminal nodes.

Next, the operation of path setting will be described in more detail.

Figure 9A:
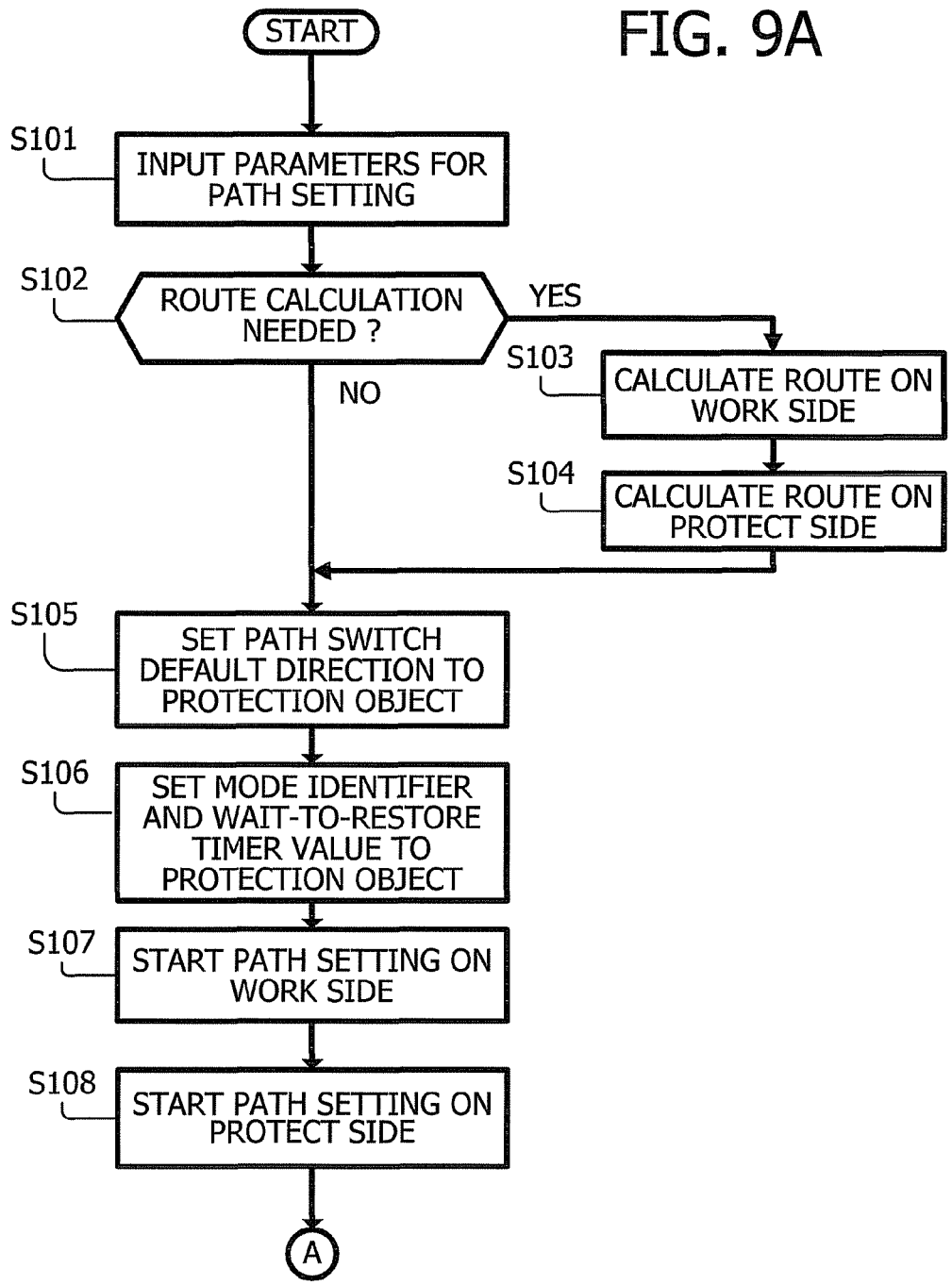
FIGS. 9A and 9B are diagrams illustrating an example of a processing flowchart at an initial node, according to an embodiment.
Figure 9B:
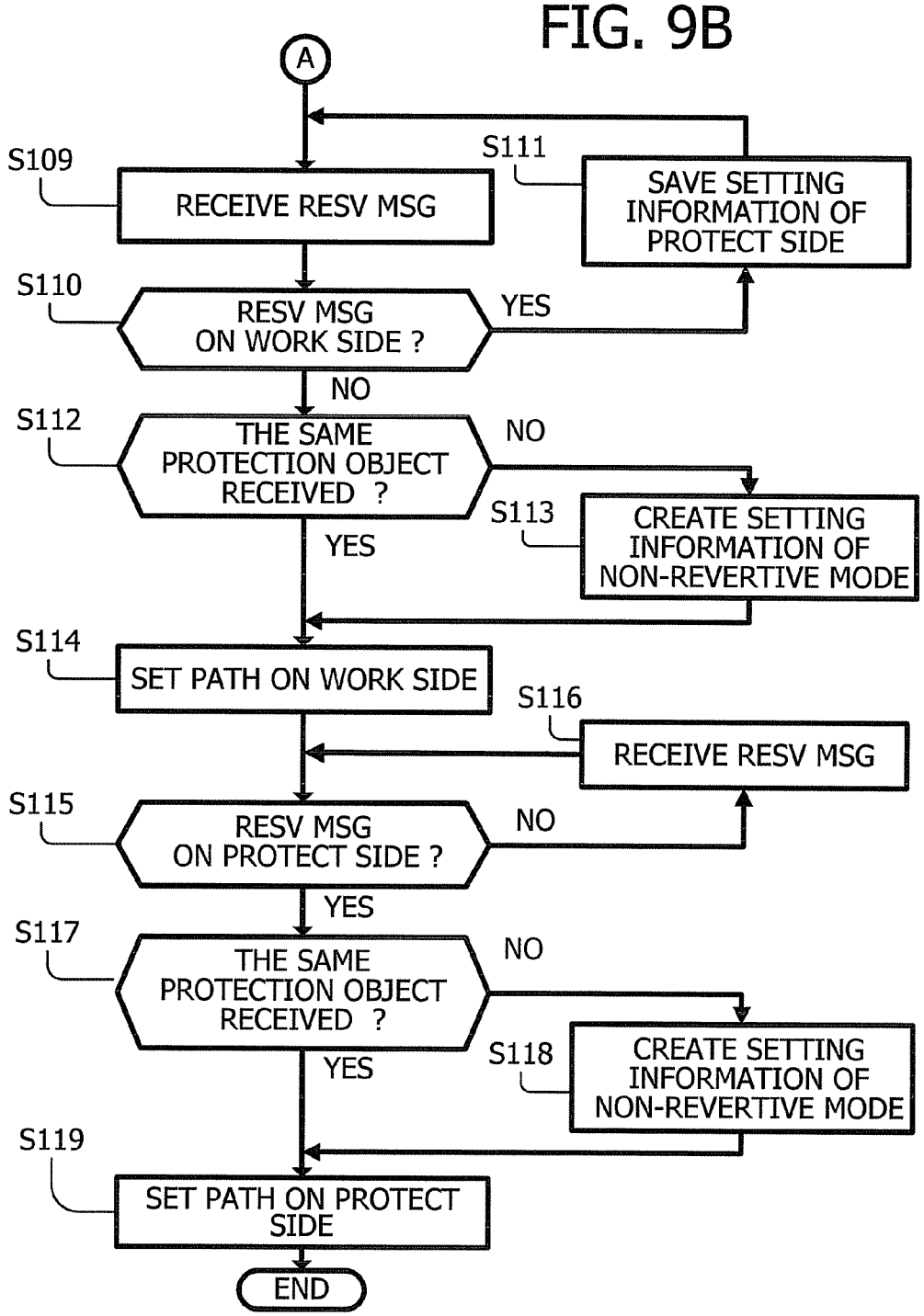
Figure 10A:
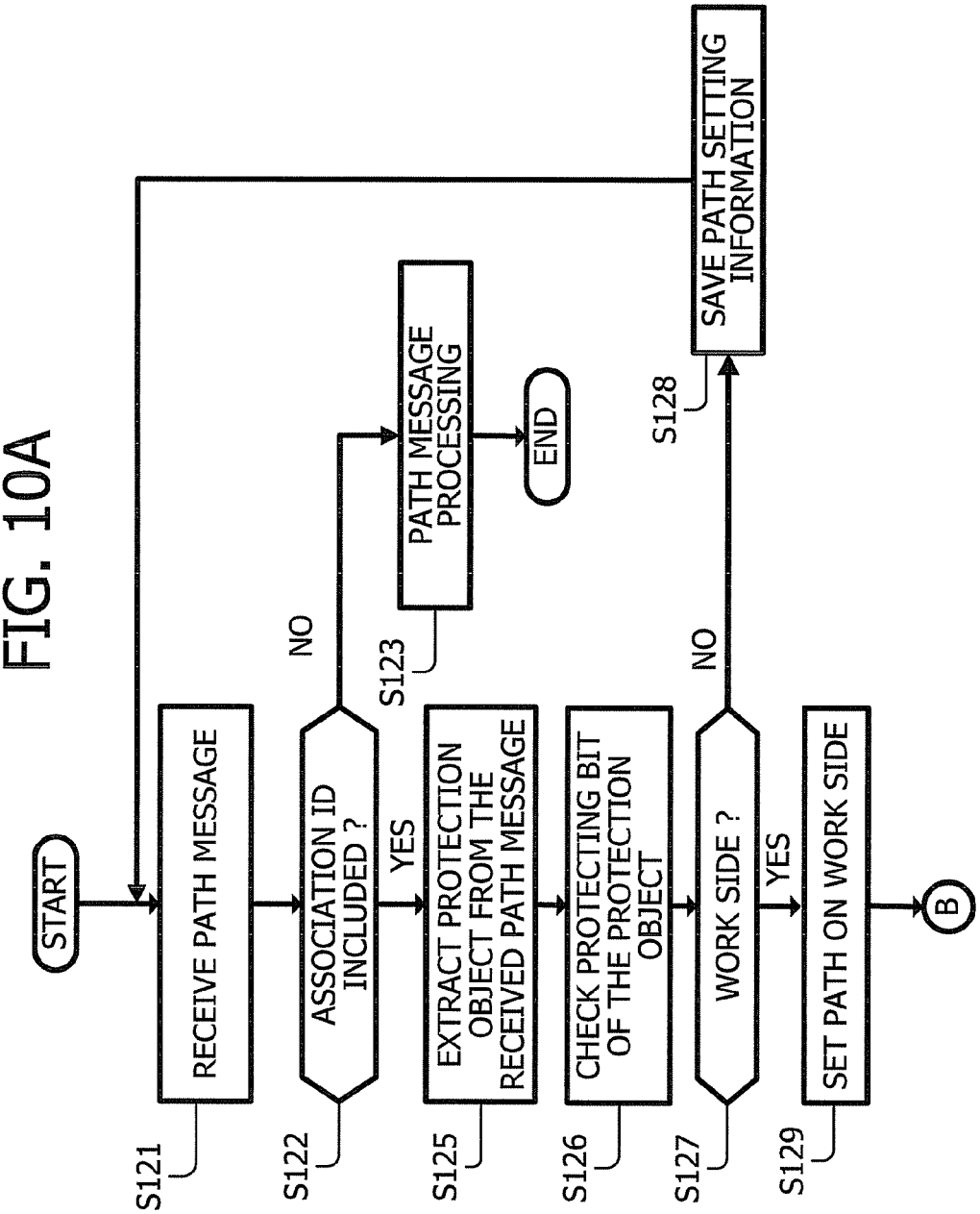
FIGS. 10A and 10B are diagrams illustrating an example of a processing flowchart at a terminal node, according to an embodiment.
Figure 10B:
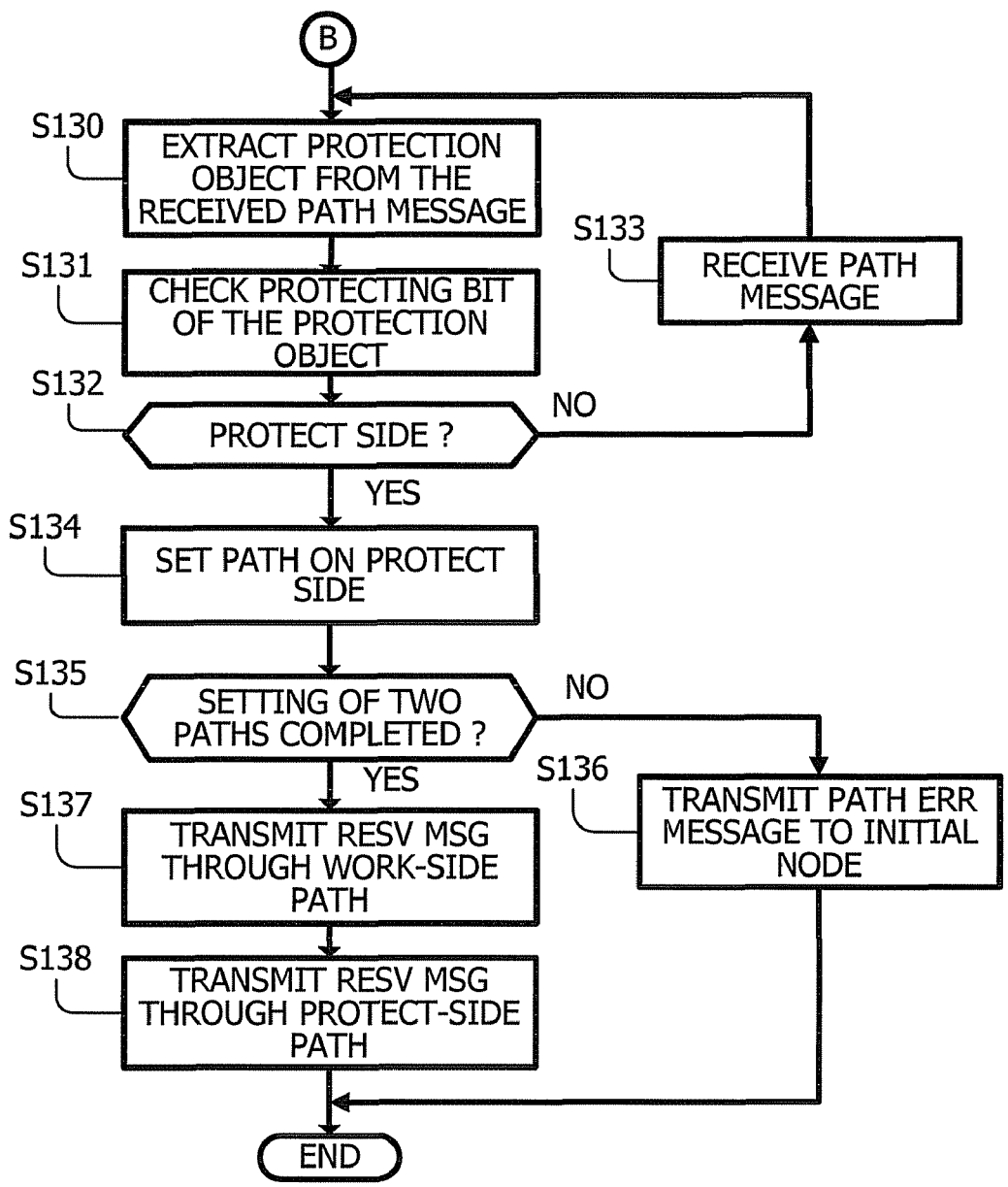
Figure 11:
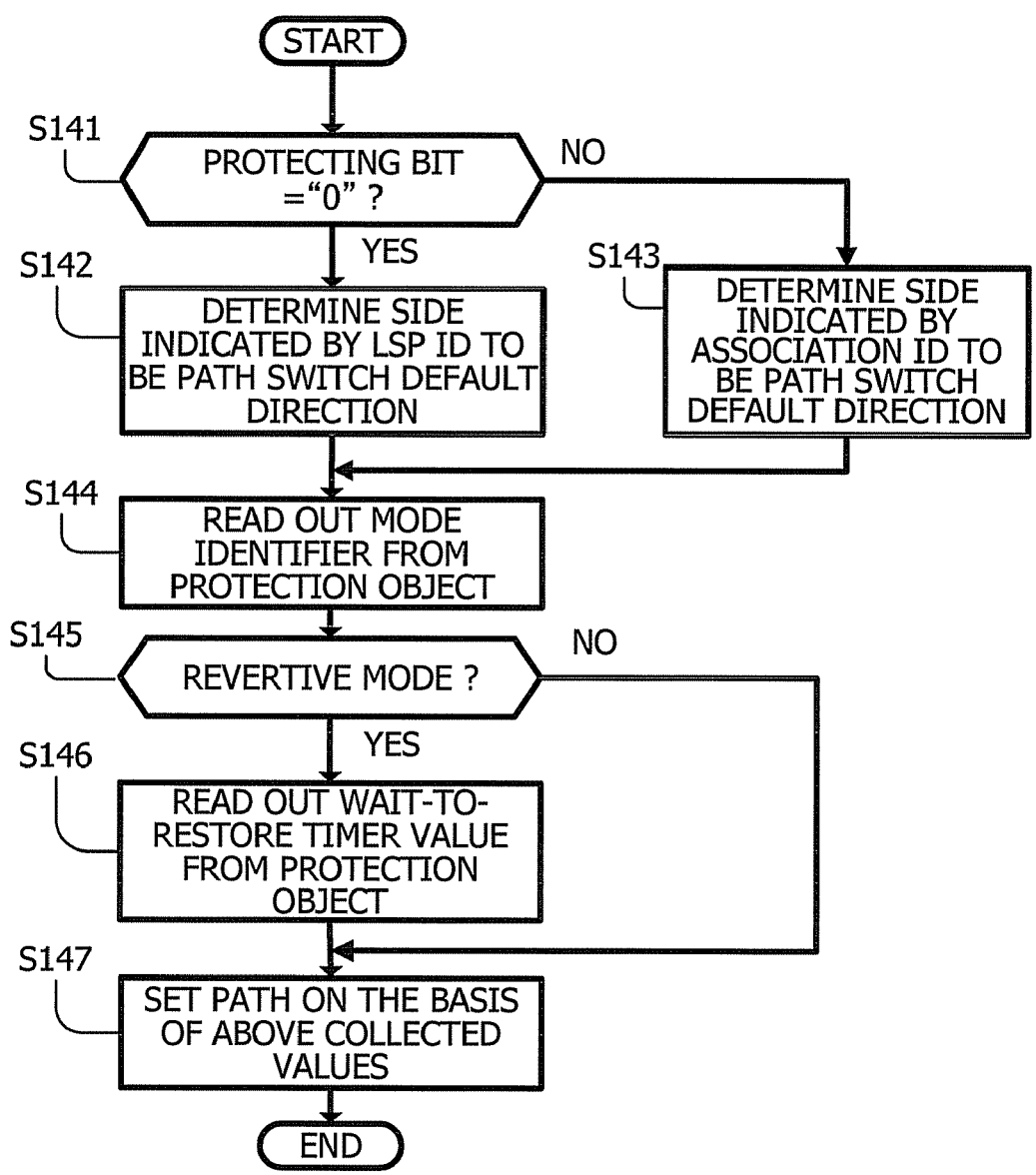
FIG. 11 is a diagram illustrating an example of a processing flowchart representing a path setting logic, according to an embodiment.

FIGS. 9A and 9B are diagrams illustrating an example of a processing flowchart at an initial node according to an embodiment, FIGS. 10A and 10B are diagrams illustrating an example of a processing flowchart at a terminal node according to an embodiment, and FIG. 11 is a diagram illustrating an example of a processing flowchart representing a path setting logic according to an embodiment. In the case of FIGS. 9A, 9B, 10A, and 10B, it is assumed that a path switch default direction is a work side, that is, a work side becomes a first path setting side and a work-side path becomes a first communication path. Therefore, a protect side becomes a second path setting side and a protect-side path becomes a second communication path.

In FIG. 9A, in network device 1A at the initial node, first, user's desired parameters (a revertive mode, a path switch default direction, and a wait-to-restore timer value) are input by a user (in step S101). Thereafter, calculation of routes on both the work and protect sides is performed as needed (in steps S102-S104). At the same time, two path setting sides on which two different communication paths each connecting the pair of nodes (that is, an initial node and a terminal node) are to be set, respectively, are determined.

Upon calculating the route along which a communication path is to be set, the initial node generates a protection object. First, a path switch default direction is set to the protection object. That is, the protecting bit of the protection object is used as a path switch default direction. In the case, it is assumed that a path switch default direction is a work side, that is, a first path setting side is a work side, and "0" is set to the protecting bit of the protection object included in a path message to be used for setting a communication path on the side identified by the path switch default direction (or on the work side), and "1" is set to the protecting bit of the protection object included in a path message to be used for setting a communication path on the side different from the path switch default direction (or on the protect side) (in step S105). Next, a mode identifier identifying the revertive mode and a wait-to-restore timer value are set to the protection object (in step S106). Then, the initial node starts setting communication paths on both the work and protect sides by transmitting path messages including the protection objects to network device 1Z at the terminal node (in steps S107, S108). At that time, the path messages for two communication paths are simultaneously transmitted from the initial node to the terminal node. That is, unlike in the case of a sequential setting method, there is no need to wait for completion of setting a work-side path. The path messages transmitted from network device 1A at the initial node are processed concurrently by network device 1Z at the terminal node. Here, processing at the terminal node depicted in FIGS. 10A and 10B will be described before proceeding to description on FIG. 9B.

FIGS. 10A and 10B are diagrams illustrating an example of a processing flowchart at a terminal node. In FIG. 10A, upon receiving a path message, network device 1Z at the terminal node first checks whether an association ID is included therein (in steps S121, S122). When the association ID is not included therein, network device 1Z determines that the path message is not a request for setting a 1+1 protected path, and processes the path message as usual to terminate processing (in step S123).

When the association ID is included therein, network device 1Z checks the protecting bit of the protection object included in the received path message to determine whether the received path message is of the work side or the protect side (in steps S125, S126). When the received path message is of the work side, path setting is performed on the work side on the basis of the mode identifier, the path switch default direction, and the wait-to-restore timer value included in the received path message (in Steps S127, S129). When the received path message was of the protect side, setting information is temporally saved until the path message of the work side is received (in step S128), and upon completion of setting a work-side path, path setting is similarly performed on the protect side on the basis of the saved setting information (in steps S130-S134).

Upon completion of setting the two communication paths at the terminal node, reserve messages are transmitted to network device 1A at the initial node through the work-side and protect-side paths (in steps S135, S137, S138). When network device 1Z fails to receive the path messages of the work side or the protect side in the path message receiving process, a path error message (abbreviated as "Path Err Message") is transmitted to inform network device 1A at the initial node of an error occurrence (in Step S136).

Returning to FIG. 9, upon receiving the reserve message transmitted from network device 1Z at the terminal node, network device 1A at the initial node checks the protecting bit of the protection object included in the received reserve message to judge whether the received reserve message is of the work side or the protect side (in steps S109, S110). When the reserve message of the protect side has been received, the setting information is temporally saved until the reserve message of the work side is received and setting of a path on the work side is completed (in step S111). When the reserve message of the work side has been received, it is determined whether the protection object included in the received reserve message is the same as the protection object included in the path message transmitted from the own network device, that is, the network device 1A at the initial node (in step S112). When the two protection objects are the same, a communication path is set on the work side (in step S114) according to the predetermined path setting logic that will be described with reference to FIG. 11. When the two protection objects are not the same, the terminal node is regarded as being a device that does not have the function complying with the embodiment, and path setting information of the non-revertive mode is prepared (in step S113) and path setting is performed on the work side using the prepared path setting information of the non-revertive mode (in step S114). As mentioned above, the initial node can determine whether the terminal node has the function complying with the embodiment by comparing the content of the received protection object with that of the protection object transmitted from the initial node itself. When the content transmitted from the initial node is not returned, it is recognized that the protocol extended according to the embodiment is not supported by the terminal node, thereby performing path setting as the non-revertive mode.

Then, path setting is performed on the protect side in the similar manner (in steps S115 to S119) according to the predetermined path setting logic that will be described with reference to FIG. 11.

FIG. 11 is a diagram illustrating an example of a flowchart for setting a communication path, according to an embodiment. In FIG. 11, when path setting is started, it is determined whether the protecting bit of the protection object included in the received message, that is, a path switch default direction identifier, is "0" or not (in step S141). In this case, when the protecting bit is "0", the path switch default direction is a work side on which a communication path designated by the LSP ID included in the received message is set (in step S142). When the protecting bit is not "0", the path switch default direction is a protect side on which a communication path designated by the association ID included in the received message is set (step S143).

Next, the value of a mode identifier is read out from the protection object (in step S144) to determine whether the protection object is of the revertive mode or not (in step S145). When the protection object is of the revertive mode, the wait-to-restore timer value is further read out from the projection object (in step S146). Then, path setting is performed on the basis of the above collected values (in step S147).

Next, operations between the initial node and the terminal node will be described in detail.

Figure 12:
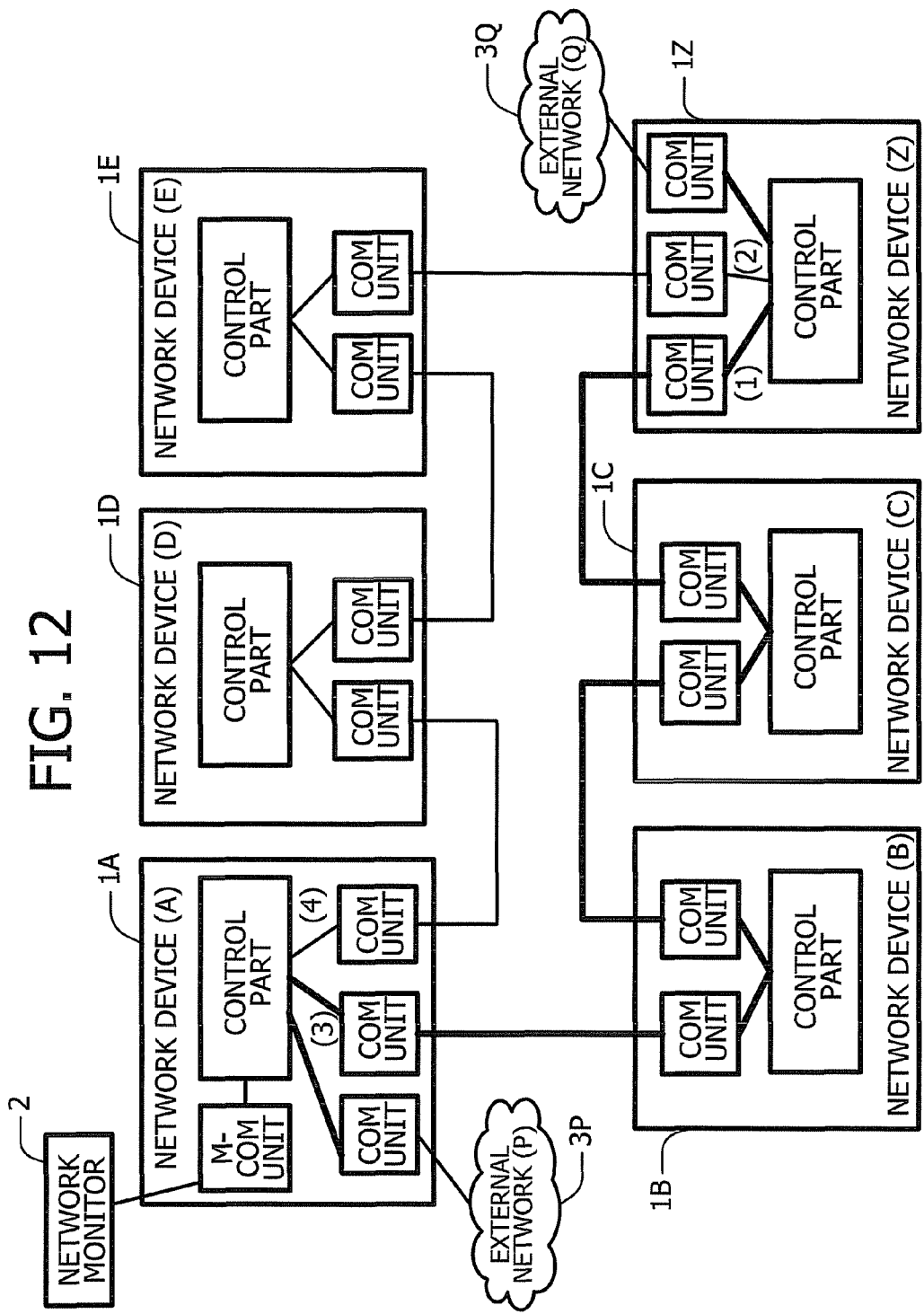
FIG. 12 is a schematic diagram illustrating an example of an operation for setting two communication paths between a pair of nodes in a network, according to an embodiment.
Figure 13:
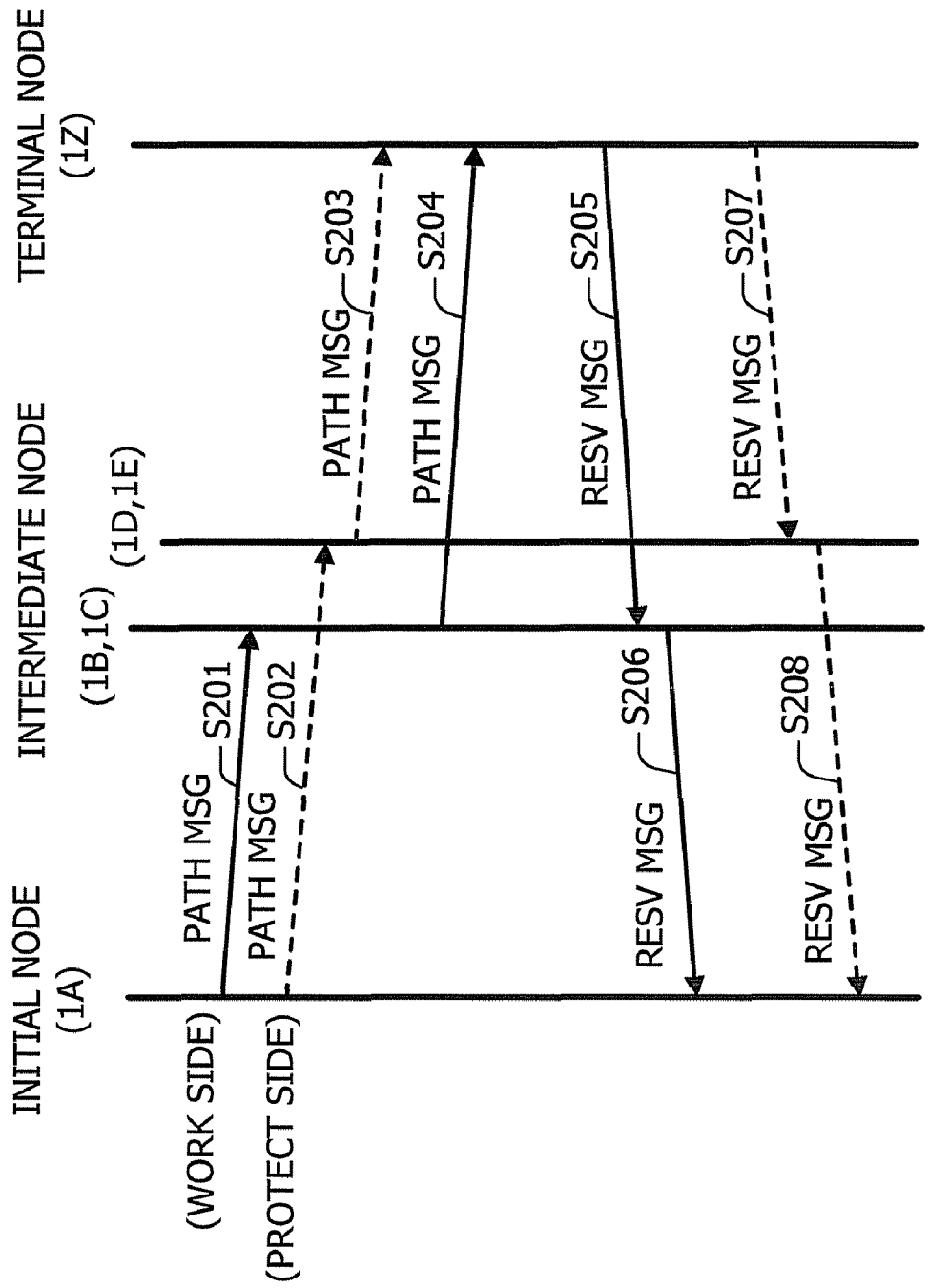
FIG. 13 is a diagram illustrating an example of a message sequence for setting two communication paths between a pair of nodes in a network, according to an embodiment.
Figure 14:
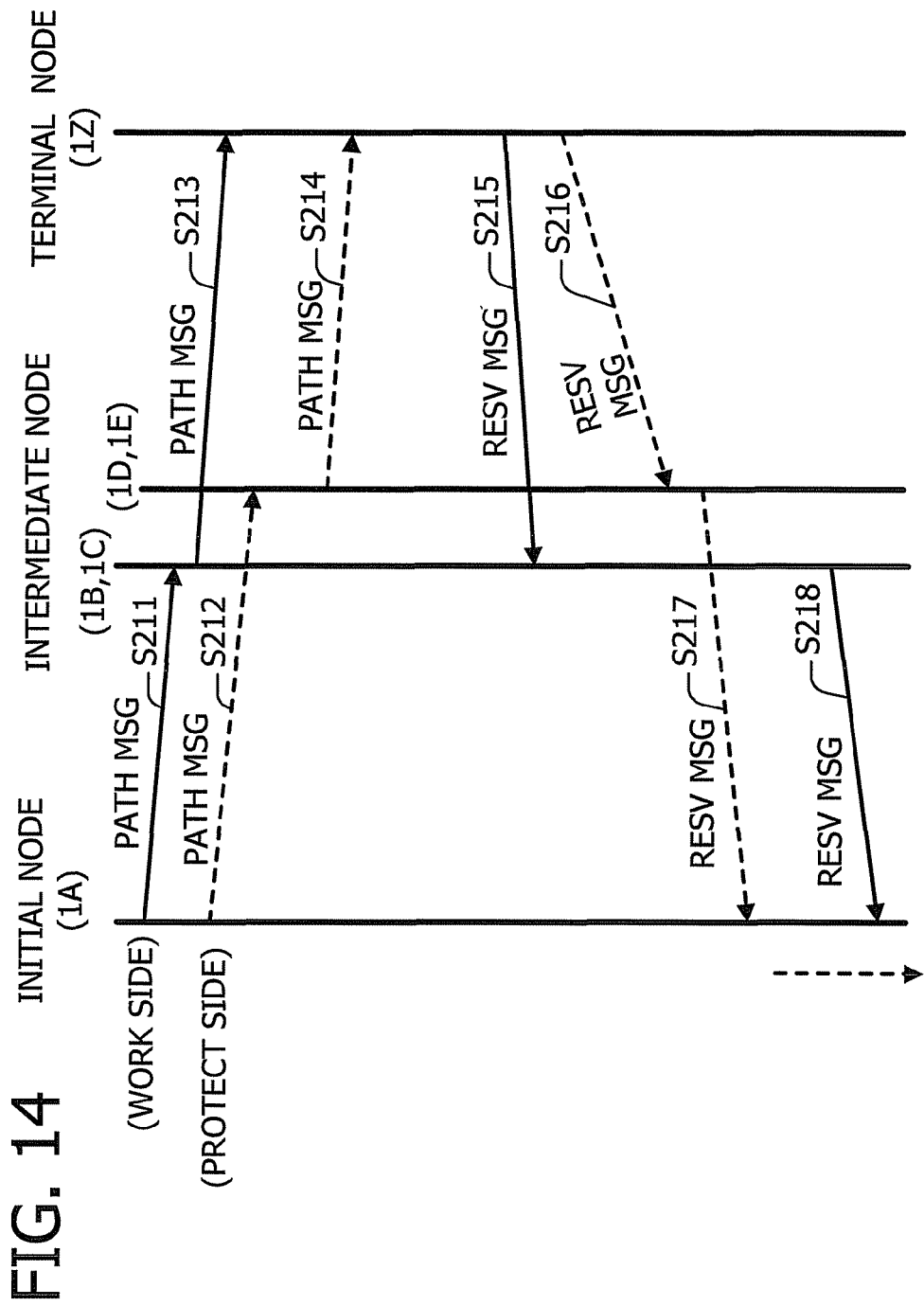
FIG. 14 is a diagram illustrating an example of a message sequence for setting two communication paths between a pair of nodes in a network, according to an embodiment.
Figure 15:
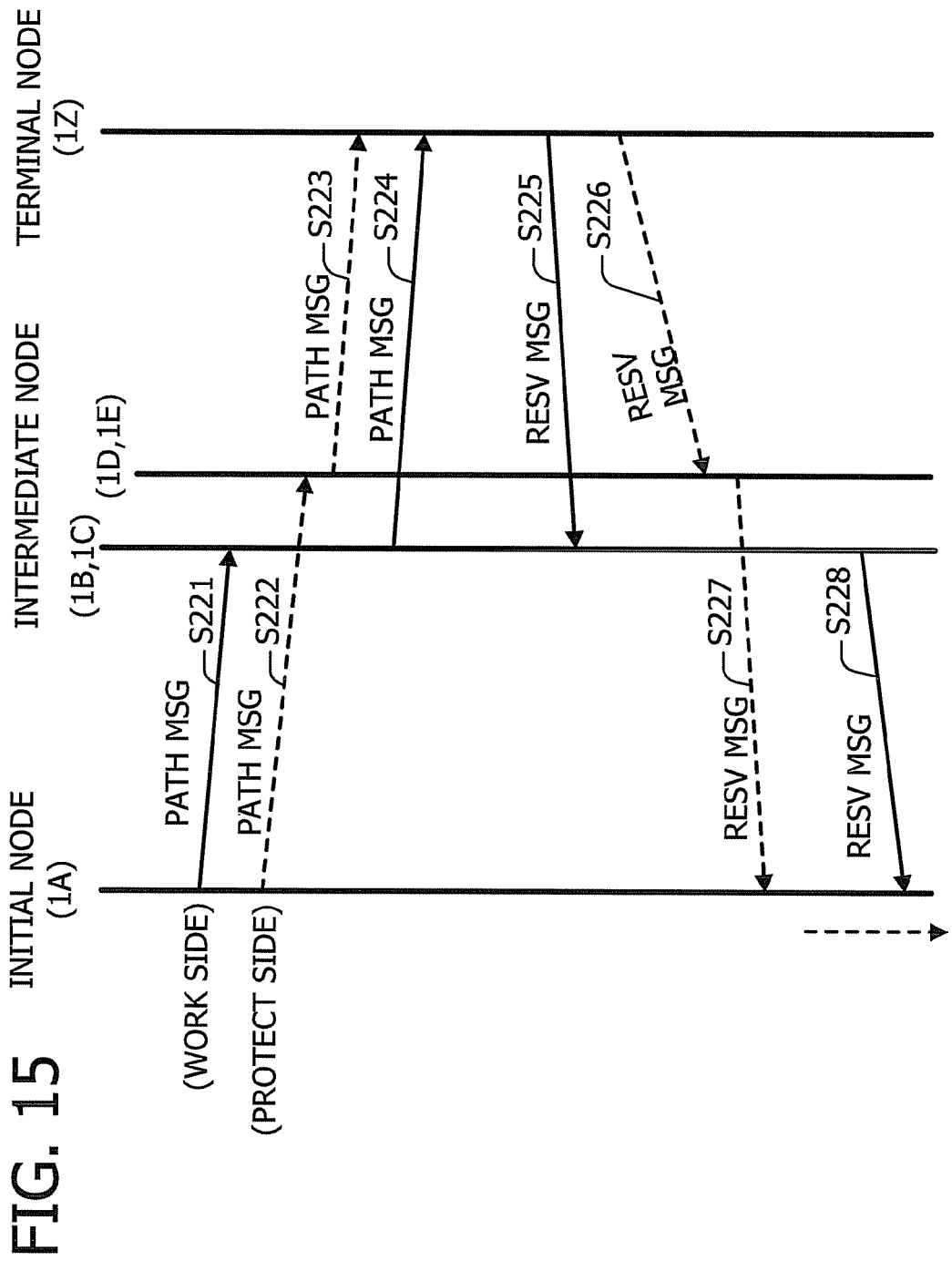
FIG. 15 is a diagram illustrating an example of a message sequence for setting two communication paths between a pair of nodes in a network, according to an embodiment.

FIG. 12 is a schematic diagram illustrating an example of an operation for setting two communication paths between a pair of nodes in a network, where it is assumed that the configuration of the network is the same as that depicted in FIG. 7. FIGS. 13 to 15 are sequence charts each illustrating an example of a message sequence for setting two communication paths between a pair of nodes in a network, in which FIG. 13 illustrates the case where reversing of a message sequence occurs during processing on path messages, FIG. 14 illustrates the case where reversing of a message sequence occurs during processing on reserve messages, and FIG. 15 illustrates the case where reversing of a message sequence occurs during processing on both path messages and reserve messages. In the case of FIGS. 12 to 15, it is assumed that a path switch default direction is a work side, that is, a work side becomes a first path setting side and a work-side path becomes a first communication path. Therefore, a protect side becomes a second path setting side and a protect-side path becomes a second communication path.

FIG. 13 is a diagram illustrating an example of a message sequence for setting a communication path, according to an embodiment, where reversing of a message sequence occurs during processing on path messages.

In FIG. 13, the path message of the work side and the path message of the protect side are reversed in the order of transmission while traveling from network device 1A at the initial node to network device 1Z at the terminal node, that is, in the course of processing the path messages. In this case, path messages of the work side and the protect side are transmitted from network device 1A at the initial node (in steps S201, S202). Thereafter, the path message of the protect side arrives at network device 1Z at the terminal node earlier than that of the work side for some reason (in step S203). The network device 1Z at the terminal node that has received the path message determines whether the received path message is of the work side or the protect side. In the case, since the path message is of the protect side, network device 1Z keeps the received path message not-processed. Thereafter, when a different path message is received (in step S204) and determined to be of the work side, setting of a first communication path on the work side is performed in accordance with information included in the received path message. By the above mentioned processing, with reference to FIG. 12, path setting of (1) in FIG. 12 that is a part of a first communication path can be carried out. At the completion of path setting on the work side by network device 1Z at the terminal node, setting of a second communication path on the protect side is performed. By this processing, path setting of (2) in FIG. 12 that is a part of a second communication path can be carried out. Thereafter, reserve messages of the work side and the protect side are transmitted from network device 1Z at the terminal node to network device 1A at the initial node (in steps S205 to S208).

Network device 1A at the initial node analyzes the received reserve message to determine whether the received reserve message is of the work side or the protect side. Then, when the received reserve message is determined to be of the work side, path setting of (3) in FIG. 12 that is a part of the first communication path is carried out. Then, a different reserve message is received and analyzed, and when the received reserve message is determined to be of the protect side, path setting (4) in FIG. 12 that is a part of the second communication path is carried out. As mentioned above, by setting two communication paths in the order of the first communication path (including (1), (3) of FIG. 12) and the second communication path (including (2), (4) of FIG. 12), the first communication path on the work side always turns into a state ready for communication and the first communication path on the work-side path is selected as a working path.

FIG. 14 is a diagram illustrating an example of a message sequence for setting two communication paths between a pair of nodes, according to an embodiment, where reversing of a message sequence occurs during processing on a reserve message.

In FIG. 14, the path message of the work side and the path message of the protect side are not reversed in the order of transmission while traveling from network device 1A at the initial node to network device 1Z at the terminal node, but are reversed in the order of transmission while traveling from network device 1Z at the terminal node to network device 1A at the initial node, that is, in the course of processing the reserve messages.

In this case, the path messages sent out from network device 1A at the initial node (in steps S211, S212) arrive at network device 1Z in the order of the work side and the protect side (in steps S213, S214). The network device 1Z at the terminal node checks the protecting bit of the protection object included in the received path message to determine whether the received path message is of the work side or the protect side. In the case, since the first received path message is of the work side, path setting of (1) in FIG. 12 that is a part of a first communication path is carried out first. Thereafter, the protecting bit of the next received path message is checked. Here, since the next received path message is of the protect side, the path setting (2) in FIG. 12 that is a part of a second communication path is carried out next. After completion of path setting on both the work and protect sides, reserve messages are transmitted in the order of the work side and the protect side, from network device 1Z at the terminal node to network device 1A at the initial node (in steps S215, S216).

In FIG. 14, in the process of processing the transmitted reserve messages at the intermediate nodes, a difference in message processing time arises between the work side and the protect side, and the reserve messages arrive at network device 1A in the order of the protect side and the work side (in steps S217, S218). Network device 1A at the initial node checks the protecting bit of the protection object included in the received reserve message to determine whether the received reserve message is of the work side or of the protect side. When the reserve message of the protect side has been received, the network device 1A waits for reception of a reserve message of the work side without performing path setting process on the protect side (for example, the path setting of (4) in FIG. 12 that is a part of the second communication path). Upon receiving the reserve message of the work side, the protecting bit of the protection object of the received reserve message is checked. Then, when the received reserve message has been determined to be of the work side, path setting of (3) in FIG. 12 that is a part of the first communication path is carried out. Thereafter, network device 1A performs processing (the path setting of (4) in FIG. 12 that is a part of the second communication path) on the reserve message of the protect side that was received before the reserve message of the work side. As mentioned above, the first communication path on the work side can be first set as a working path since path settings are carried out in the order of (1) to (2) of FIG. 12 at the terminal node and in the order of (3) to (4) of FIG. 12 at the initial node.

FIG. 15 is a diagram illustrating an example of a message sequence for setting two communication paths between a pair of nodes, according to an embodiment, where reversing of a message sequence occurs during processing on both a path message and a reserve message.

In FIG. 15, path messages of a work side and a protect side are reversed in the order of transmission, both while traveling from network device 1A at the initial node to network device 1Z at the terminal node and while traveling from network device 1Z at the terminal node to network device 1A at the initial node. This case is a combination of the case depicted in FIG. 13 and the case depicted in FIG. 14. In this case, the similar operation described in FIG. 13 is performed as to reversing of the path messages, and the similar operation described in FIG. 14 is performed as to reversing of the reserve messages. As mentioned above, since two communication paths are set in the order of the first communication and the second communication path, that is, in the order of (1) to (2) and in the order of (3) to (4) in FIG. 12, the first communication path on the work side (or the first path setting side) is firstly set as a working path that is to be currently used.

Finally, the case will be considered where one of an initial node and a terminal node is a device that does not comply with the embodiment, that is, network device 1A complies with the embodiment but opposite network device 1Z does not comply with the embodiment, or network device 1Z complies with the embodiment but opposite network device 1A does not comply with the embodiment. As for the case where an initial node complies with the embodiment and an opposite node (a terminal node) does not comply with the embodiment, the processing on reserve messages that is depicted in steps S112, S113, S117, S118 of FIG. 9B can be applied.

As for the other case, operations can be performed in the following manner. In this embodiment, the path switch default direction is determined based on the protecting bit of the protection object, as depicted in FIG. 11. The protecting bit can be used in the similar manner in the case of a device that does not comply with the embodiment. Therefore, when a device utilizes the protection object as defined in RFC 4872, the device complying with the embodiment can set the path switch default direction regardless of whether the opposite device complies with the embodiment or not. In this embodiment, when determining a revertive mode, and when transmitting and receiving a wait-to-restore timer value, the reserved area of a protection object is utilized. In general, as an operation based on RFC (Request For Comment), "0"s are embed in the reserved area. An opposite device conforming to this rule will handle the reserved area on the premise that "0"s are embed in the reserved area. Therefore, viewing from the device complying with the embodiment, it is requested that the wait-to-restore timer value is "0" in the case of a non-revertive mode (when R bit is "0"). As a result, even if the opposite device does not support the embodiment, the opposite device can surely operate as a non-revertive mode as long as the opposite device operates in accordance with the IETF.

As described above, according to the embodiment, there exist the following advantages:
(1) Even in the autonomous path setting such as GMPLS or the like, the function of a revertive mode can be performed.
(2) The information needed for setting a communication path is embedded in the signaling message and it is not necessary for an initial node and a terminal node of the communication path to transmit and receive information other than the signaling message so as to set the communication path. In particular, extension of a message format is minimized and no new message object is added to handle setting of a communication path, thereby increasing affinity with the existing techniques.
(3) Path setting can be started always from the work side both at the initial node and at the terminal node, regardless of a revertive mode or a non-revertive mode, by checking the information identifying the work side/the protect side embedded in the signaling message.
(4) Even if communicating with the opposite device not complying with the embodiment, a device can surely identify the path switch default direction and set a communication path as the non-revertive mode.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a showing of the superiority and inferiority of the embodiment. Although the embodiment(s) have been described in detail, it should be understood that the various changes, substitutions, and alterations could be made hereto without departing from the spirit and scope of the invention.

What is claimed is:

1. A method for setting communication paths between an initial node and a terminal node that are connected to each other through one or more intermediate nodes in a network, the method comprising:
  determining two path setting sides on which two different communication paths each connecting the initial node and the terminal node are to be set, respectively;
  creating two path setting messages for setting the two different communication paths between the initial node and the terminal node through the one or more intermediate nodes, the two path setting messages each including:
    path switch default direction information identifying one of the two path setting sides on which a working path is to be set in an initial state,
    a wait-to-restore timer value, and
    a mode identifier identifying a revertive mode in which a first communication path set on a first path setting side identified by the path switch default direction information is operated as a working path in the initial state, a second communication path set on a second path setting side that is the other one of the two path setting sides is operated as a working path upon occurrence of a fault on the first path setting side, and the first communication path set on the first path setting side is again operated as a working path when no faults have occurred during a time period indicated by the wait-to-restore timer value after recovery of the fault on the first path setting side;
  concurrently transmitting first and second path setting messages for setting the first and second communication paths, respectively, from the initial node to the terminal node through the one or more intermediate nodes;
  identifying the first communication path that is to be operated as a working path in the initial state, using the path switch default direction information included in the received first and second path setting messages;
  setting, to the terminal node, the identified first communication path before setting the second communication path, independently of arriving order of the first and second path setting messages, wherein first and second response messages indicating completion of setting the first and second communication paths, respectively, are transmitted from the terminal node to the initial node through the one or more intermediate nodes, in the order of the first and second response messages independently of arriving order of the first and second path setting messages; and
  setting, to the initial node, the first communication path before setting the second communication path, independently of arriving order of the first and second response messages from the terminal node, so that the first communication path is established between the initial node and the terminal node prior to the second communication path.

2. The method of claim 1, wherein the mode identifier and the wait-to-restore timer value are stored in a reserved area that is included in each of the two path setting messages and is not used in the case that the mode identifier included therein does not identify the revertive mode.

3. The method of claim 1, wherein the information on the path switch default direction is a bit that is included in each of the two path setting messages and used for identifying one of the two path setting sides.

4. The method of claim 1, wherein, in the case of the mode identifier not identifying the revertive mode, the first communication path set on the first path setting side is operated as a working path in the initial state, and the second communication path set on the second path setting side is operated as a working path either upon occurrence of a fault on the first path setting side or after recovery thereof.

5. An apparatus for setting communication paths between an initial node and a terminal node that are connected to each other through one or more intermediate nodes in a network, the apparatus serving as the initial node, the apparatus comprising:

a plurality of communication units interfaces each performing to perform transmission of signals between the initial node and the terminal node via the one or more intermediate nodes; and a controller configured to:

determine two path setting sides on which two different communication paths each coupling the initial node and the terminal node are to be set, respectively;

create two path setting messages for setting the two different communication paths between the initial node and the terminal node through the one or more intermediate nodes, the two path setting messages each including:

path switch default direction information to identify one of the two path setting sides on which a working path is to be set in an initial state, a wait-to-restore timer value, and a mode identifier to identify a revertive mode in which a first communication path set on a first path setting side identified by the path switch default direction information is operated as a working path in the initial state, a second communication path set on a second path setting side that is the other one of the two path setting sides is operated as a working path upon occurrence of a fault on the first path setting side, and the first communication path set on the first path setting side is again operated as a working path when no faults have occurred during a time period indicated by the wait-to-restore timer value after recovery of the fault on the first path setting side;

concurrently transmit first and second path setting messages for setting the first and second communication paths, respectively, from the initial node to the terminal node through the one or more intermediate nodes, wherein the first communication path that is to be operated as a working path in the initial state is identified using the path switch default direction information included in the received first and second path setting messages, the identified first communication path is set to the terminal node before the second communication path is set to the terminal node, independently of arriving order of the first and second path setting messages from the initial node, and first and second response messages indicating notifying completion of setting the first and second communication paths, respectively, are transmitted from the terminal node to the initial node through the one or more intermediate nodes, in the order of the first and second response messages, independently of arriving order of the first and second path setting messages; and set the first communication path before setting the second communication path, independently of arriving order of the first and second response messages from the terminal node, so that the first communication path is established between the initial node and the terminal node prior to the second communication path.

6. The apparatus of claim 5, wherein the mode identifier and the wait-to-restore timer value are stored in a reserved area that is included in each of the two path setting messages and is not used in the case that the mode identifier included therein does not identify the revertive mode.

7. The apparatus of claim 5, wherein the information on the path switch default direction is a bit that is included in each of the two path setting messages and used for identifying one of the two path setting sides.

8. The apparatus of claim 5, wherein, in the case of the mode identifier not identifying the revertive mode, the first communication path set on the first path setting side is operated as a working path in the initial state, and the second communication path set on the second path setting side is operated as a working path either upon occurrence of a fault on the first path setting side or after recovery thereof.

* * * * *